(12) United States Patent (10) Patent No.: US 8,171,106 B2
Chaudhary et al. (45) Date of Patent: May 1, 2012

(54) PER FILE SYSTEM USAGE OF NETWORKS

(75) Inventors: Puneet Chaudhary, Highland, NY (US); Kalyan C. Gunda, Wappingers Falls, NY (US); Gautam Haridas Shah, Shrewsbury, MA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 12/333,380

(22) Filed: Dec. 12, 2008

(65) Prior Publication Data

US 2010/0153526 A1 Jun. 17, 2010

(51) Int. Cl.
*G06F 15/16* (2006.01)

(52) U.S. Cl. ....................................... 709/217; 709/227

(58) Field of Classification Search .................. 709/214, 709/217
See application file for complete search history.

(56) References Cited

U.S. PATENT DOCUMENTS

| | | | |
|---|---|---|---|
| 5,909,540 A * | 6/1999 | Carter et al. ........................ | 714/4 |
| 6,684,270 B1 | 1/2004 | Chmara et al. | |
| 6,754,188 B1 | 6/2004 | Garahi et al. | |
| 6,775,235 B2 | 8/2004 | Datta et al. | |
| 6,931,530 B2 | 8/2005 | Pham et al. | |
| 6,944,785 B2 * | 9/2005 | Gadir et al. ........................ | 714/4 |
| 7,240,100 B1 * | 7/2007 | Wein et al. ..................... | 709/214 |
| 7,254,636 B1 | 8/2007 | O'Toole, Jr. et al. | |
| 7,287,180 B1 * | 10/2007 | Chen et al. ......................... | 714/4 |
| 7,406,473 B1 * | 7/2008 | Brassow et al. ........................ | 1/1 |
| 7,536,593 B2 * | 5/2009 | Benhase et al. .................. | 714/20 |
| 7,603,439 B2 * | 10/2009 | Dilley et al. .................... | 709/219 |
| 7,676,628 B1 * | 3/2010 | Compton et al. ............. | 711/114 |
| 2002/0069239 A1 * | 6/2002 | Katada et al. .................. | 709/202 |
| 2003/0191935 A1 * | 10/2003 | Ferguson ....................... | 713/153 |
| 2003/0233423 A1 * | 12/2003 | Dilley et al. ................... | 709/214 |
| 2005/0210316 A1 * | 9/2005 | Benhase et al. .................... | 714/6 |
| 2009/0199177 A1 * | 8/2009 | Edwards et al. .................. | 718/1 |

FOREIGN PATENT DOCUMENTS

JP 2000-194639 7/2000

OTHER PUBLICATIONS

Chen et al., "A Cost-Effective, High Bandwidth Server I/O Network Architecture for Cluster Systems", Parallel and Distributed Processing Symposium, 2007. IEEE International, Mar. 26-30, 2007, pp. 1-10; ISBN: 1-4244-0910-1.

* cited by examiner

*Primary Examiner* — Jeffrey Pwu
*Assistant Examiner* — Gerald Smarth
(74) *Attorney, Agent, or Firm* — Stephen Bongini; Fleit Gibbons Gutman Bongini & Bianco PL

(57) ABSTRACT

A method, information processing system, and computer program product access data in a system. The system includes a plurality of Network Shared Disk servers and at least one set of Network Shared Disks. Each of the Network Shared Disks are served by at least one of the Network Shared Disk servers across a multiple networks. Configuration data that includes information indicating which of the networks is associated with each of the Network Shared Disks for the one node is analyzed. A first of the Network Shared Disks to be accessed is identified. One of the networks that is associated with the first Network Shared Disk is selected based on the configuration data. The first Network Shared Disk is accessed via the one network that was selected.

20 Claims, 5 Drawing Sheets

PER FILE SYSTEM USAGE OF NETWORKS

FIELD OF THE INVENTION

The present invention generally relates to file systems, and more particularly relates to servicing I/O requests in a system with I/O servers.

BACKGROUND OF THE INVENTION

Existing versions of the General Parallel File System ("GPFS") utilize a single networking mechanism such as Ethernet to connect all nodes in the system. In other words, existing versions of GPFS do not allow nodes to access file systems over multiple networks. This is inefficient because customers are unable to implement provisioning of bandwidth to a resource that is dependent upon who is accessing the data and where it is accessed from. Being able to provision bandwidth among multiple networks is advantageous because it allows for a more efficient system.

SUMMARY OF THE INVENTION

Briefly, in accordance with the present invention, disclosed are a method, system, and computer program product for accessing data in a system. The system includes a plurality of Network Shared Disk servers and at least one set of Network Shared Disks. Each of the Network Shared Disks is served by at least one of the Network Shared Disk servers across a multiple networks. The method includes analyzing configuration data that includes information indicating which of the networks is associated with each of the Network Shared Disks for the one node is analyzed. A first of the Network Shared Disks to be accessed is identified. One of the networks that are associated with the first Network Shared Disk is selected based on the configuration data. The first Network Shared Disk is accessed via the one network that was selected.

In another embodiment, an information processing system for accessing data in a system is disclosed. The system includes plurality of Network Shared Disk servers and at least one set of Network Shared Disk. Each of the Network Shared Disks is served by at least one of the Network Shared Disk servers across a multiple networks. The information processing system includes a memory and a processor that is communicatively coupled to the memory. The information processing system also includes a data access manager that is communicatively coupled to the memory and processor. The data access manager is adapted to a analyze configuration data that includes information indicating which of the networks is associated with each of the Network Shared Disks for the one node is analyzed. A first of the Network Shared Disks to be accessed is identified. One of the networks that are associated with the first Network Shared Disk is selected based on the configuration data. The first Network Shared Disk is accessed via the one network that was selected.

In yet another embodiment, a computer program product for accessing data in a system is disclosed. The system includes a plurality of Network Shared Disk servers and at least one set of Network Shared Disks. Each of the Network Shared Disks is served by at least one of the Network Shared Disk servers across a multiple networks. The computer program product includes instructions for analyzing configuration data that includes information indicating which of the networks is associated with each of the Network Shared Disks for the one node is analyzed. A first of the Network Shared Disks to be accessed is identified. One of the networks that are associated with the first Network Shared Disk is selected based on the configuration data. The first Network Shared Disk is accessed via the one network that was selected.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION

Embodiments of the present invention allow multiple Network Storage Disk ("NSD") servers to "simultaneously" access a given Logical Unit Number ("LUN"). Therefore, each NSD client is able to select which NSD server to use for obtaining data from a given LUN. This can be used to control load balance across the server(s) serving the same set of LUN, control network partitioning by balancing loads on different networks, and control workload partitioning for the system.

System Overview

Figure 1:
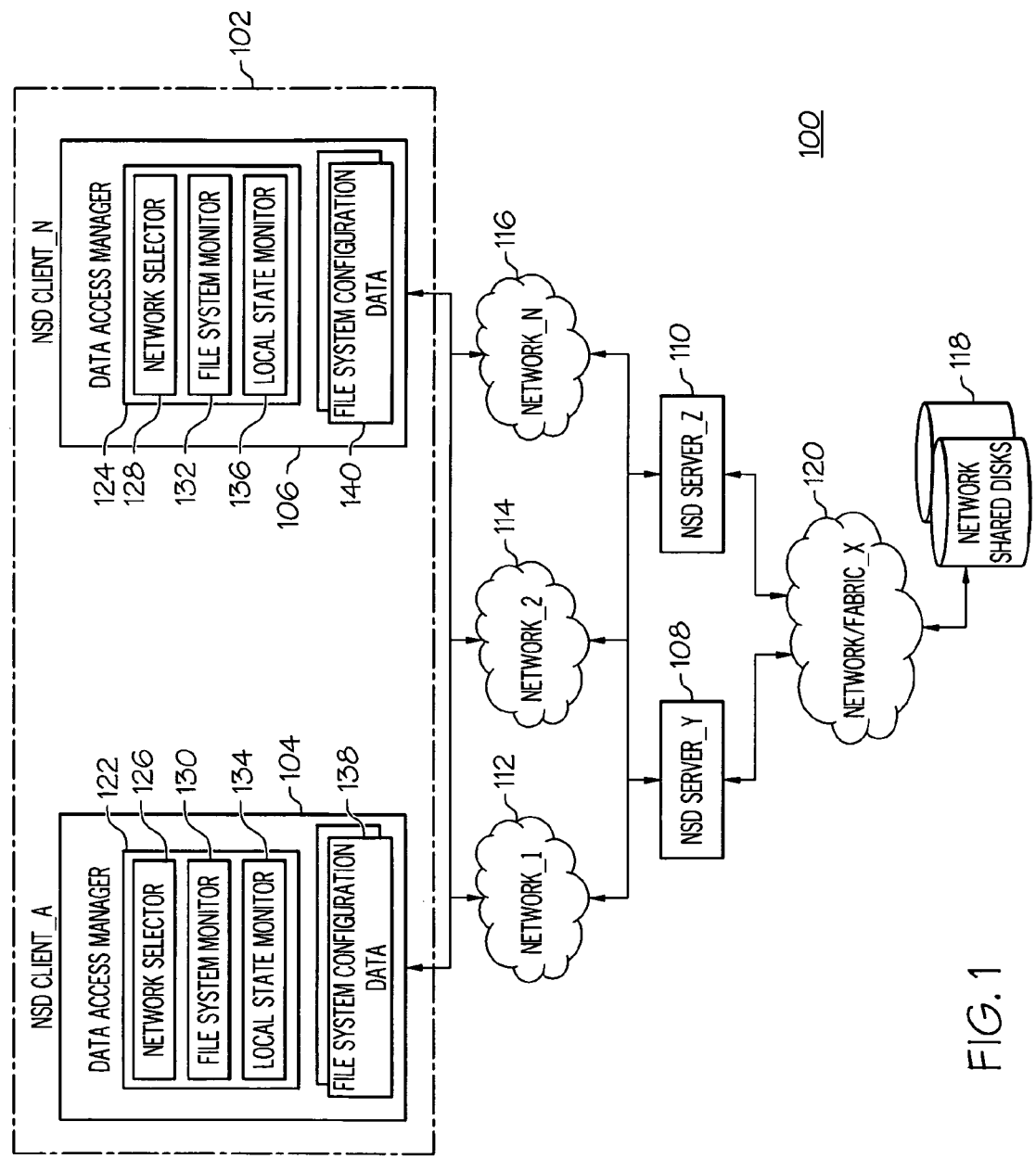
FIG. 1 is a block diagram illustrating an operating environment in accordance with one embodiment of the present invention.

FIG. 1 illustrates one operating environment for providing multiple NSD server access to a given NSD across multiple networks that utilize different communication technologies in accordance with one embodiment of the present invention. As shown, a cluster 102 of computing nodes 104 and 106 is provided in the operating environment 100. In this embodiment, the operating environment 100 implements a parallel file system such as a GPFS environment. GPFS provides concurrent high-speed file access to applications executing on multiple nodes in various types of clusters such as an AIX cluster, a Linux cluster, or a heterogeneous cluster of AIX and Linux nodes. A more detailed description of GPFS can be found on the Internet at publib.boulder.ibm.com/infocenter/clresctr/vxrx/index.jsp?topic=/com.ibm.cluster. gpfs.doc/gpfsbooks.html and in the article "GPFS: A Shared-Disk File System for Large Computing Clusters Source" (F. Schmuck et al., Proceedings of the Conference on File and Storage Technologies, 2002, pp. 231-244, ISBN: 1-880446-03-0, both of which are herein incorporated by reference in their entirety.

The operating environment 100 also includes multiple computing nodes 108 and 110. In this embodiment, the computing nodes 104 and 106 are communicatively coupled to one another and to the computing nodes 108 and 110 via multiple suitable communication mechanisms 112, 114, and 116, such as high-capacity switches or networks (typically networks that support the TCP/IP stack) that each employ different networking technologies and characteristics. For example, in this embodiment the first communication mechanism 112 employs a networking technology that provides a faster throughput rate than the networking technology implemented in the second communication mechanism 114. The computing nodes 108 and 110 are communicatively coupled to one or more NSDs 118 (or LUNs) via another network 120, such as a fiber channel Storage Area Network ("SAN"). It should be noted that throughout this discussion the terms "NSD" and "LUN" are used interchangeably. The NSD 118, in this embodiment, includes one or more disks (hardware or software RAID) that are presented as one logical entity by storage hardware and/or operating systems.

As shown in FIG. 1, the computing nodes 108 and 110 have local access to the NSD 118 via network_X 120 (e.g., a SAN network). While in this embodiment the disks within the LUN 118 are connected via a common network (network_X 120) to multiple servers 108 and 110, in further embodiments one or more of the disks within the LUN 118 can be communicatively coupled to multiple servers 108 and 110 via multiple networks or separate/independent networks.

In the illustrated configuration in which all of the computing nodes have local access to the LUN 118 (via connectivity to network_X 120), data used by applications flows over the network_X 120 and control information flows among the GPFS instances in the cluster 102 over one or more of network_1 112 (e.g., a Local Area Network, or LAN), network_2 114 (e.g., InfiniBand), and network_N 116 (e.g., Federation). However, in some environments, every node in the cluster is not able to be communicatively coupled to the network_X 120. This is the case with respect to the client processing nodes 104 and 106 of FIG. 1. Therefore, the GPFS environment 100 makes use of a network block device capability. For example, in this embodiment the GPFS environment 100 provides a block level interface over the networks 112, 114, and 116 communicatively coupled to the nodes 104 and 106, referred to as "Network Shared Disk".

GPFS clusters use NSD to provide high speed data access to applications running on LAN-attached nodes, such as processing nodes 104 and 106. In this configuration, disks are (SAN) attached only to the NSD servers 108 and 110. However, in further embodiments of the present invention other configurations such as (but not limited to) direct connection to the NSD servers and zone configurations are used. Each NSD server 108 and 110 is attached to all or a portion of the disk collection 118. In conventional GPFS environments, data from a particular LUN is served to these client nodes from a single NSD server over a single network. Stated differently, a single NSD server services all subnets of LAN-attached (i.e., single network) nodes.

However, in embodiments of the present invention, a subset of the total node population is defined as NSD server nodes. In other words, multiple NSD severs can access a particular LUN to provide data to the computing nodes. The computing nodes can access a particular LUN over multiple networks. The NSD Servers are responsible for the abstraction of disk data blocks across multiple IP-based networks.

FIG. 1 shows an exemplary configuration in which the processing nodes 104 and 106 are connected to multiple NSD servers 107 and 108 using multiple networks 112, 114, and 116 that each implement a different networking technology and have different characteristics. In this example, data to the NSD servers 108 and 110 flows over network_X 120, and both data and control information to the clients flow across one of the multiple networks 112, 114, and 116 that is selected by a processing node 104 and 106 for accessing the LUN 118. Thus, the processing nodes 104 and 106 are referred to as "NSD clients" 104 and 106.

This configuration allows multiple NSD servers to "simultaneously" access a given LUN, and processing nodes to select a network to access a given LUN based on the LUN being accessed. In this embodiment, each of the NSD clients 104 and 106 has a data access manager 122 and 124 for managing network selection and data retrieval. The data access manager 122 and 124 includes a network selector 126 and 128, a file system monitor 130 and 132, and a local state monitor 134 and 136. These components analyze file system configuration data 138 and 140 for selecting one of the networks 112, 114, and 116 to obtain data from a given LUN 118. Although a single cluster 102 is shown in FIG. 1, the present invention is also applicable in multi-clustered environments.

Multiple Network Access for a Given LUN

Figure 2:
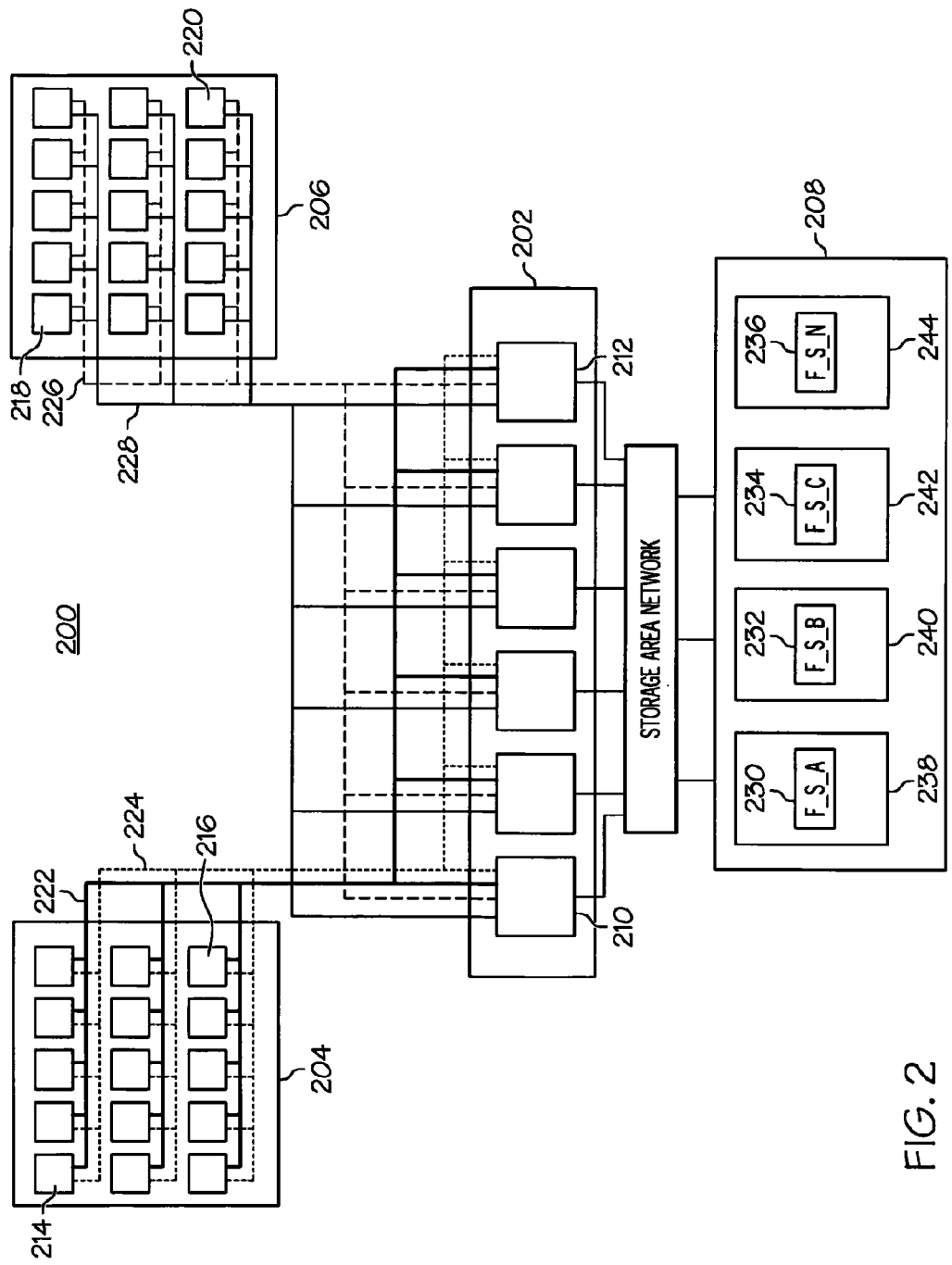
FIG. 2 is a block diagram illustrating another operating environment in accordance with one embodiment of the present invention.

FIG. 2 shows another exemplary operating environment in accordance with one embodiment of the present invention. As shown, in this GPFS environment 200, multiple clusters 202, 204, and 206 are communicatively coupled to a plurality of NSDs 208. Each of the clusters 202, 204, and 206 includes multiple processing nodes such as processing nodes 210, 212, 214, 216, 218, and 220. The processing nodes 210 and 212 within Cluster_1 202 are NSD servers. The processing nodes 214, 216, 218, and 220 within Cluster_2 204 and Cluster_N 206 are designated as NSD clients.

The configuration of FIG. 2 allows multiple NSD servers 210 and 212 to simultaneously service I/O requests from different clients 214-220. Because multiple NSD servers 210 and 212 service I/O requests from different clients, there can be achieved better control of load balancing on the server, better network partitioning by balancing loads on different networks and reducing loads on different networks, and better control of file system server workload partitioning for the system. In this embodiment, the NSD clients 214-220 are partitioned to the NSD servers within Cluster_1 202. However, in another embodiment, each NSD client 214-220 is able to access any of the NSD severs within Cluster_1 202.

In this embodiment, primary and secondary NSD sever configurations such as those used in conventional GPFS environments are not used and a single network between the NSD servers 210 and 212 is not used. Instead, multiple networks 222, 224, 226, and 228 connect each of the NSD clients 214-220 to each of the NSD servers. Embodiments of the present invention include a mechanism for an NSD client to select one of the multiple networks 222-228 for communicating with an NSD server based on the file system 230, 232, 234, and 236 that the NSD is requesting to access. As shown in FIG. 2, each of the file systems 230-236 resides on one or more network disks 238-244. A mechanism could also be included in the NSD clients 214-220 for selecting a particular NSD server. Another U.S. patent application (Ser. No. 11/970,379, filed Jan. 7, 2008) entitled "Multiple Network Shared Disk Servers", which is herein incorporated by reference in its entirety, provides a more detailed discussion on NSD server selection processes.

In one exemplary embodiment, the data access manager 122, via the network selector 126, allows an NSD client (such as NSD client 214) to select one of the multiple networks 222-228 to which it is coupled for accessing a file system 230-236. The file system configuration data 138 that is made available to the NSD clients 214-220 identifies, among other things, the networks communicatively coupled to the NSD clients 214-220, the file systems 230-236 (this information can identify the LUNs that make up a file system), and the networks 222-228 associated with each file system 230-236.

The file system configuration data 138 of this embodiment also includes information that indicates which networks are to be used to access a particular file system. File system configuration data 138 is not limited to residing at each node. In further embodiments, the file system configuration data 138 resides at one or a subset of the nodes and is shared among the other nodes. The file system configuration data 138 can also reside on a remote information processing unit.

Figure 3:
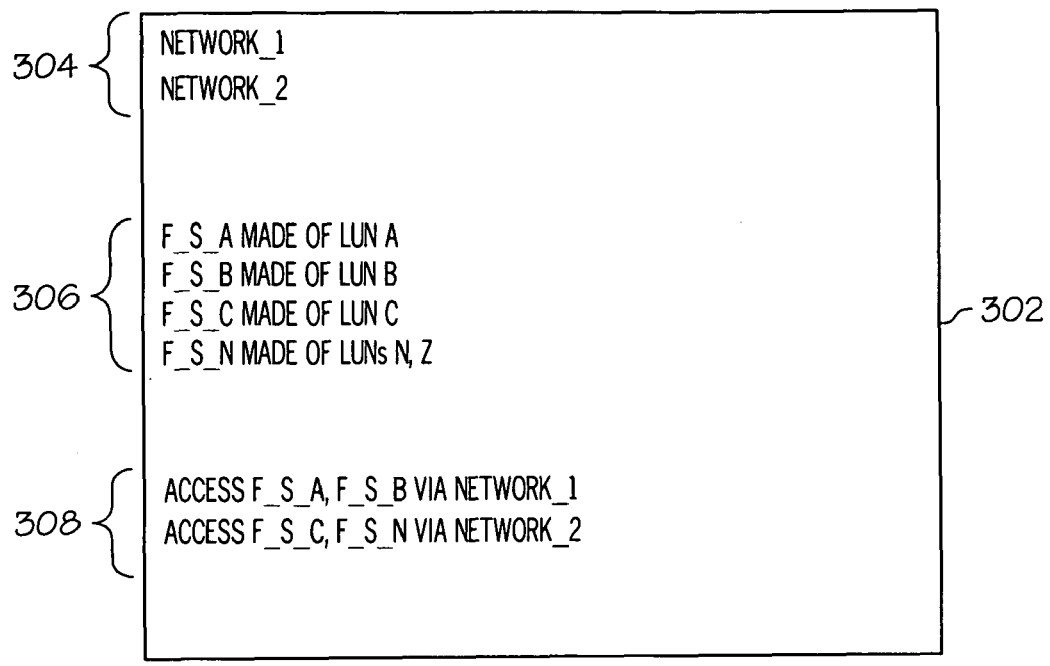
FIGS. 3 and 4 show exemplary system configuration data according to one embodiment of the present invention.
Figure 4:
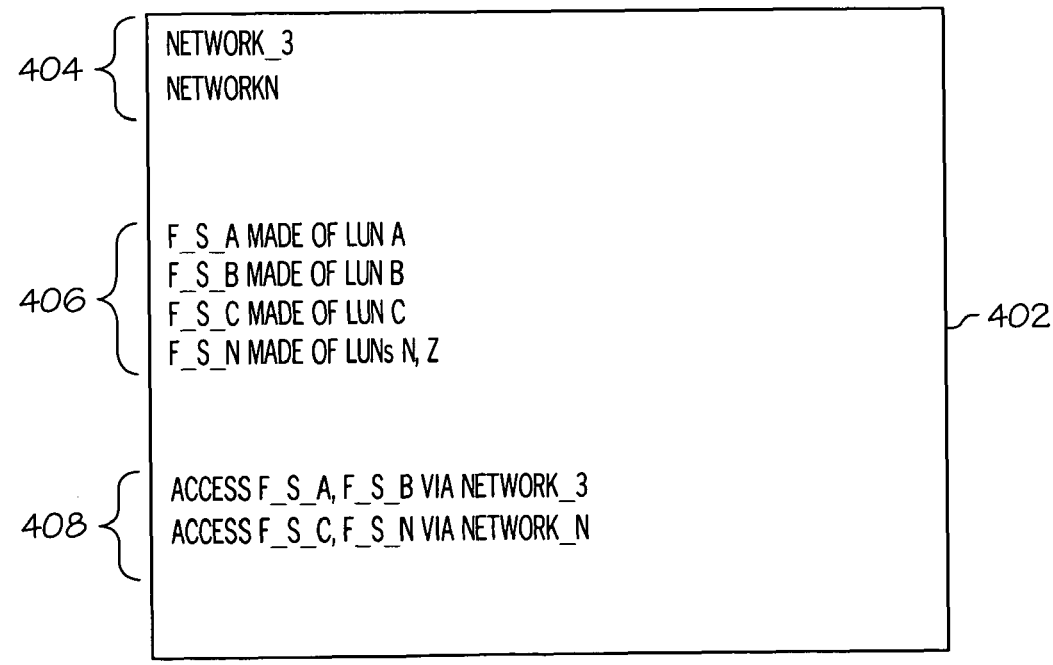

FIGS. 3 and 4 show exemplary file system configuration data according to one embodiment of the present invention. In FIG. 3, an administrator has created a GPFS cluster (such as Cluster_2 204) and has created the file system configuration data 302 associated with that cluster. The file system configuration data 302 of FIG. 3 includes network data 304, file system data 306, and file system access data 308. The network data 304 identifies the various networks that are communicatively coupled to each NSD client in Cluser_1 204. For example, as shown in FIG. 2 and as indicated in FIG. 3, each NSD client in Cluster_2 204 is communicatively coupled to Network_1 222 (e.g., a Gigabit Ethernet network) and Network_2 224 (e.g., a 10 Gb Ethernet network). File system configuration data 402 associated with Cluster_3 206, as shown in FIG. 4, likewise indicates via the network information 404 that each NSD client in Cluster_3 206 is communicatively coupled to Network_3 226 (e.g., an InfiniBand network) and Network_N 228 (e.g., another Gigabit Ethernet network).

The file system data 306 and 406 indicates the LUNs that make up a particular file system, such as LUNs A and D that make up file system 1. The access data 308 and 408 indicates the networks that an NSD client is to select for accessing each file system. For example, the file system configuration data 304 of FIG. 3 shows that file_system_A 230 and file_system_B 232 are to be accessed using Network_1 222, while file_system_C 234 and file_system_N 236 are to be accessed using Network_2 224. Also, the access data 408 in the file system configuration data 402 for Cluster_3 shows that file_system_A 230 and file_system_B 232 are to be accessed using Network_3 226, while file_system_C 234 and file_system_N 236 are to be accessed using Network_N 228. The file system configuration data shown in FIGS. 3 and 4 is meant to be exemplary, and is not meant to limit the present invention to any particular type or format of system configuration data. Also, the configuration data is not static in this embodiment; an administrator can update or send new configuration data when desired.

As explained above, an administrator creates the file system configuration data 138 and makes it available to the NSD clients 214-220. The data access manager 122 of an NSD node, via the local state determiner 134, analyzes the file system configuration data 138 and determines the networks to which it is connected. The network selector 126 of the data access manager 122 then identifies the LUN or file system to be accessed. The data access manager 122 further analyzes the file system configuration data 138 to determine which network the client is to use for accessing the file system. For example, if a node within Cluster_1 204 is to access file_system_A 230, then the network selector 126 selects Network_1 222.

Therefore, an administrator can mange the resources in the system by configuring nodes to access file systems across different networks. In other words, data in one or more file systems can be presented to users across one or more computer clusters making optimal user of the networks available between the computer clusters and the NSD servers. A cluster can be configured to access file systems that would most efficiently utilize the networking resources that are available for that cluster.

Operational Flow for Multiple NSD Server Access for a Given LUN

Figure 5:
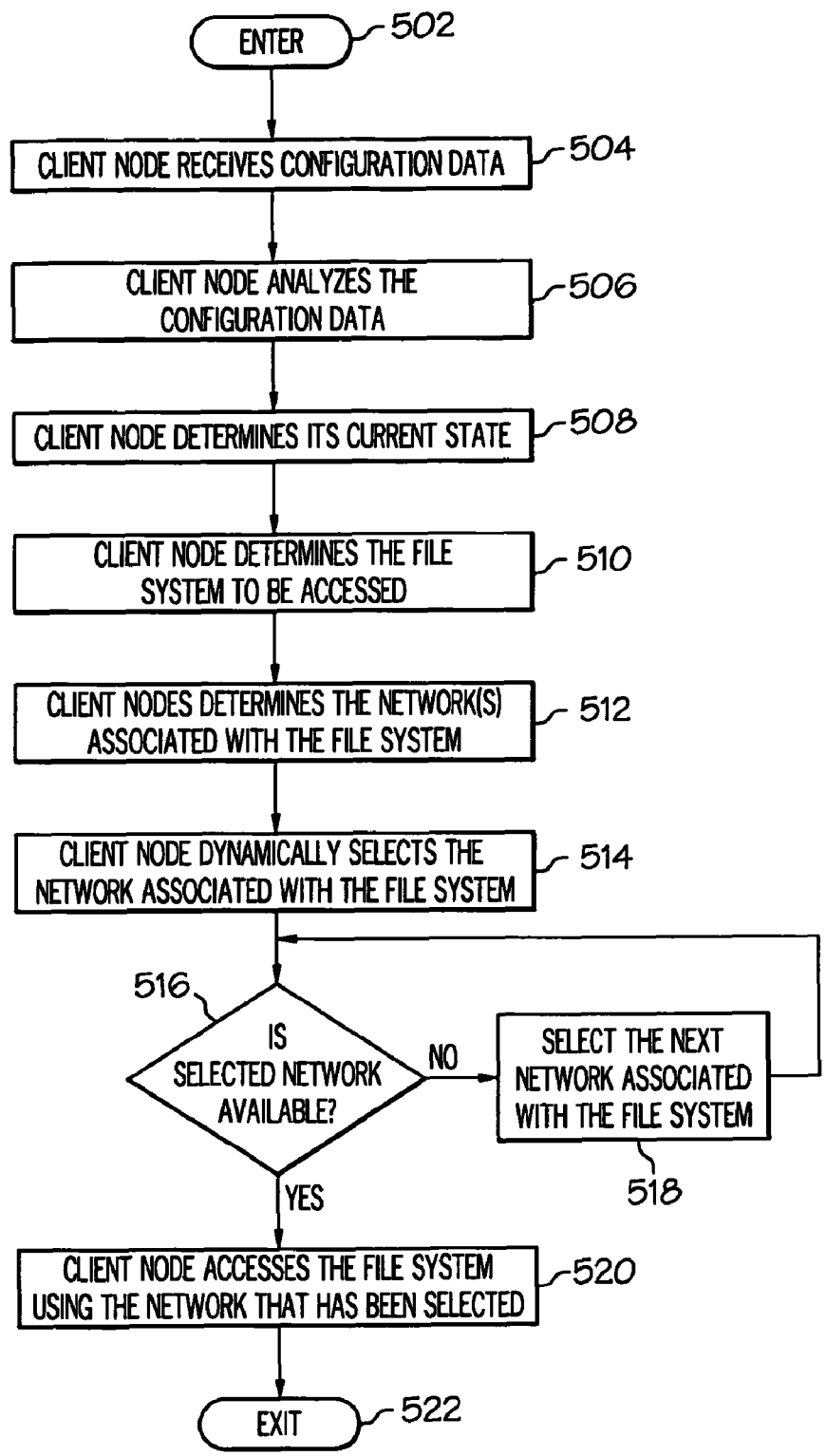
FIG. 5 is an operational flow diagram illustrating a process for providing multiple NSD server access for a given LUN according to one embodiment of the present invention.

FIG. 5 is an operational flow diagram illustrating a process for accessing multiple NSDs via multiple networks according to one embodiment of the present invention. The operational flow diagram begins at step 502 and flows directly to step 504. At step 504, configuration data (for example, that shown in FIGS. 3 and 4) is sent to the client nodes 104 and 106. The data access manager 122 at a client node 104, analyzes the configuration data, at step 506.

The client node 104, at step 508, determines its local state. For example, the client node 104 determines, among other things, the networks 222 and 224 to which it is connected. The client node 104, via its data access manager 122, determines the file system that is to be accessed, at step 510.

The client node 104, at step 512, determines from the file system configuration data 138 the network(s) that is associated with the file system 230. The client node 104, at step 514, dynamically selects the network associated with the file system 230. The client node 104, at step 516, accesses the file system 230 using the network that was selected. The control flow then exits at step 518.

Information Processing System

Figure 6:
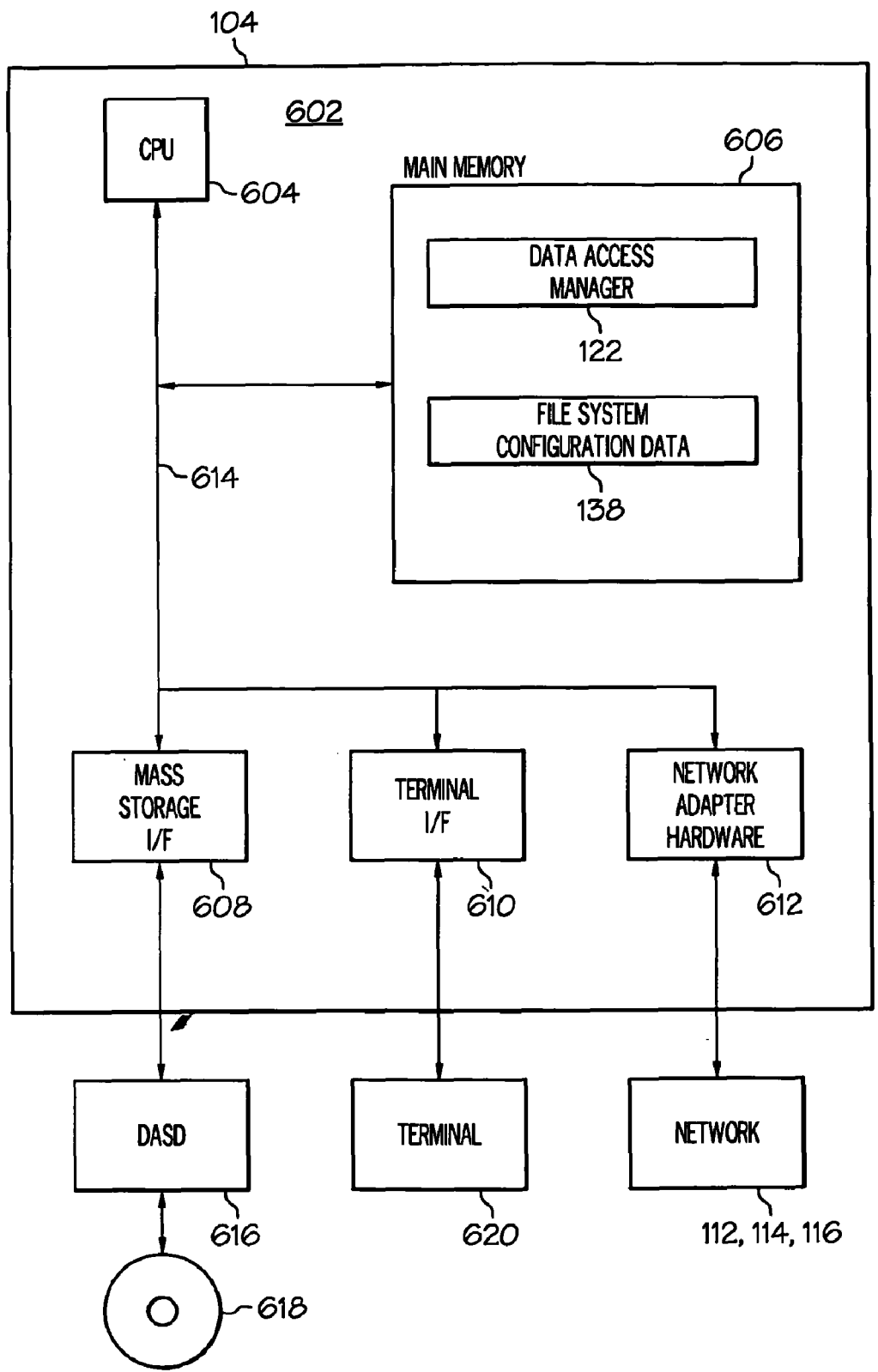
FIG. 6 is a block diagram illustrating an information processing system in accordance with one embodiment of the present invention.

FIG. 6 is a block diagram illustrating an information processing system 600 that is useful for implementing embodiments of the present invention. The information processing system 600 is a suitably configured processing system, such as a personal computer, workstation, or the like.

The illustrated information processing system 600 includes a computer 602. The computer 602 has a processor 604 that is connected to a main memory 606, a mass storage interface 608, a terminal interface 610, and network adapter hardware 612. A system bus 614 interconnects these system components. The mass storage interface 608 is used to connect mass storage devices, such as data storage device 616, to the information processing system 104. One specific type of data storage device is a disk drive that can store data to and read data from a computer readable medium, such as an optical disk 618 or a magnetic disk.

The main memory 606, in this embodiment, includes a data access manager 122 and its components and file system configuration data 138. Although illustrated as concurrently resident in the main memory 606, components are not required to be completely resident in the main memory 606 at all times or even at the same time. In this embodiment, the information processing system 600 utilizes conventional virtual addressing mechanisms to allow programs to behave as if they have access to a large, single storage entity, referred to as computer system memory, instead of access to multiple, smaller storage entities such as the main memory 606 and data storage device 616. The term "computer system memory" thus generically refers to the entire virtual memory of the information processing system 600.

Although only one CPU 604 is illustrated for computer 602, computer systems with multiple CPUs can be used equally effectively. This embodiment of the present invention further incorporates interfaces that each includes separate, fully programmed microprocessors that are used to off-load processing from the CPU 604. Terminal interface 610 is used to directly connect one or more terminals 620 to computer 602 to provide a user interface to the computer 602. These terminals 620, which are able to be non-intelligent or fully programmable workstations, are used to allow system administrators and users to communicate with the information processing system 600. The terminal 620 is also able to be a user interface and peripheral devices that are connected to computer 602 and controlled by terminal interface hardware included in the terminal interface 610 that includes video adapters and interfaces for keyboards, pointing devices, and the like.

An operating system is included in the main memory, and is preferably a suitable multitasking operating system. However, further embodiments of the present invention use any other suitable operating system. Some embodiments of the present invention utilize an architecture, such as an object oriented framework mechanism, that allows instructions of the components of operating system to be executed on any processor located within the information processing system 600. The network adapter hardware 612 is used to provide an interface to one or more networks 112-116. Embodiments of the present invention are able to be adapted to work with any data communications connections including present day analog and/or digital techniques or via a future networking mechanism.

Although this exemplary embodiment of the present invention is described in the context of a fully functional computer system, further embodiments are capable of being distributed as a program product via a tangible computer readable medium (such as a CD, DVD, diskette, flash memory device, or other form of recordable media), or via any type of electronic transmission mechanism.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, one embodiment of the present invention may not include all of the features described above. Therefore, it is intended that the present invention not be limited to the particular embodiments disclosed, but that the invention include all embodiments falling within the scope of the appended claims.

What is claimed is:

1. A method for accessing data in a system, the method comprising the steps of:
    analyzing, by one node in a cluster of nodes, configuration data that includes at least network access information indicating which of a plurality of physical networks is associated with each file system in a plurality of file systems, at least one file system in the plurality of files systems being associated with at least two different physical networks in the plurality of physical networks, and the plurality of file systems residing in a Network Shared Disk of at least one set of Network shared disks for the one node, each of the Network Shared Disks being served by at least one Network Shared Disk server of a plurality of Network Shared Disk servers across the plurality of networks, the cluster of nodes being separate and distinct from the plurality of Network Shared Disk servers;
    identifying, by the one node, a first file system of the plurality of file systems to be accessed;
    identifying, by the one node, a first physical network from the plurality of physical networks that is associated with the first file system based on the network access information;
    selecting, by the one node, the first physical network from at least two of the physical networks that are associated with the first file system; and
    accessing, by the one node, the first file system via the first physical network that was selected.

2. The method of claim 1, further comprising:
    determining a subnet that the one node is on;
    determining, from the configuration data, which of the Network Shared Disk servers are on the subnet that the on node is on; and
    selecting one of the Network Shared Disk servers from the Network Shared Disk servers that are determined to be on the subnet that the one node is on.

3. The method of claim 1, wherein the Network Shared Disks use a General Parallel File System.

4. The method of claim 1, further comprising the steps of:
    identifying, by the one node, a second file system to be accessed;
    selecting, by the one node, a second physical network from the plurality physical networks that is associated with the second file system based on the configuration data; and
    accessing, by the one node, the second file system via the second physical network that was selected,
    wherein the second physical network is different than the first physical network.

5. The method of claim 1, wherein the network access information indicates the physical network that is to be selected by the one node for accessing each of the file systems in the plurality of file systems.

6. The method of claim 5, further comprising the steps of:
    receiving new network access information comprising information indicating at least one other physical network that is to be selected for accessing at least the first file system; and
    updating the configuration data based on the new network access information,
    wherein the other physical network is different than the first physical network.

7. The method of claim 6, further comprising the steps of:
    selecting, by the one node, the other physical network that is associated with the first file system based on the configuration data; and
    accessing, by the one node, the first file system via the other physical network that was selected.

8. The method of claim 1, further comprising the steps of:
    selecting, by a second node in the cluster of nodes, a second of the physical networks that is associated with the first file system based on the configuration data; and
    accessing, by the second node, the first file system via the second physical network that was selected,
    wherein the second physical network is different than the first physical network.

9. An information processing system for accessing data in a system, the information processing system comprising:
    a memory;
    a processor communicatively coupled to the memory; and
    a data access manager coupled to the memory and the processor, wherein the data access manager is configured to:
        analyze configuration data that includes at least network access information indicating which of a plurality of physical networks is associated with each file system in a plurality of file systems, at least one file system in the plurality of files systems being associated with at least two different physical networks in the plurality of physical networks, and the plurality of file systems residing in a Network Shared Disk of at least one set of Network shared disks for the information processing system, each of the Network Shared Disks being served by at least one Network Shared Disk server of a plurality of Network Shared Disk servers across the plurality of networks;

identify a first file system of the plurality of file systems to be accessed;

identify a first physical network from the plurality of physical networks that is associated with the first file system based on the network access information;

select the first physical network from at least two of the physical networks that are associated with the first file system; and access first file system via the first physical network that was selected.

10. The information processing system of claim 9, wherein the data access manager is further configured to:

determine a subnet that the information processing system is on;

determine, from the configuration data, which of the Network Shared Disk servers are on the subnet that the information processing system is on; and select one of the Network Shared Disk servers from the Network Shared Disk servers that are determined to be on the subnet that the information processing system is on.

11. The information processing system of claim 9, the data access manager is further configured to:

identify a second file system to be accessed;

select a second physical network from the plurality the physical networks that is associated with the second file system based on the configuration data; and access the second file system via the second physical network that was selected, wherein the second physical network is different than the first physical network.

12. The information processing system of claim 9, wherein the network access information indicates the physical network that is to be selected by the one node for accessing each of the file system in the plurality of file systems.

13. The information processing system of claim 12, wherein the data access manager is further configured to:

receive new network access information comprising information indicating at least one other physical network that is to be selected for accessing at least the first file system; and update the configuration data based on the new network access information, wherein the other physical network is different than the first physical network.

14. The information processing system of claim 13, wherein the data access manager is further configured to:

select the other physical network that is associated with the first file system based on the configuration data; and access the first file system via the other physical network that was selected.

15. The information processing system of claim 9, wherein the data access manager is further configured to:

select a second of the physical networks that is associated with the first file system based on the configuration data; and access the first file system via the second physical network that was selected, wherein the second physical network is different than the first physical network.

16. A non-transitory computer readable medium encoded with a program for accessing data in a system, the program comprising instructions for:

analyzing, by at least one node in a cluster of nodes, configuration data that includes at least network access information indicating which of a plurality of physical networks is associated with each file system in a plurality of file systems, at least one file system in the plurality of files systems being associated with at least two different physical networks in the plurality of physical networks, and the plurality of file systems residing in a Network Shared Disk of at least one set of Network shared disks for the at least one node, each of the Network Shared Disks being served by at least one Network Shared Disk server of a plurality of Network Shared Disk servers across the plurality of networks, the cluster of nodes being separate and distinct from the plurality of Network Shared Disk servers;

identifying a first file system of the plurality of file systems to be accessed;

identifying, by the one node, a first physical network from the plurality of physical networks that is associated with the first file system based on the network access information;

selecting the first physical network from at least two of the physical networks that are associated with the first file system; and accessing, by the one node, the first file system via the first physical network that was selected.

17. The non-transitory computer readable medium of claim 16, further comprising instructions for:

determining a subnet that the at least one node is on;

determining, from the configuration data, which of the Network Shared Disk servers are on the subnet that the at least one node is on; and selecting one of the Network Shared Disk servers from the Network Shared Disk servers that are determined to be on the subnet that the at least one node is on.

18. The non-transitory computer readable medium of claim 16, wherein the program further comprises instructions for:

identifying a second file system to be accessed;

selecting a second physical network from the plurality physical networks that is associated with the second file system based on the configuration data; and accessing the second file system via the second physical network that was selected, wherein the second physical network is different than the first physical network.

19. The non-transitory computer readable medium of claim 16, wherein the network access information indicates the physical network that is to be selected by the one node for accessing each of the file system in the plurality of file systems.

20. The non-transitory computer readable medium of claim 19, wherein the program further comprises instructions for:

receiving new network access information comprising information indicating at least one other physical network that is to be selected for accessing at least the first file system; and updating the configuration data based on the new network access information, wherein the other physical network is different than the first physical network.

* * * * *